Oct. 31, 1961 W. G. MIDNIGHT 3,006,515
BEVERAGE CONTAINER AND DISPENSER DEVICE
Filed Sept. 16, 1957 3 Sheets-Sheet 1
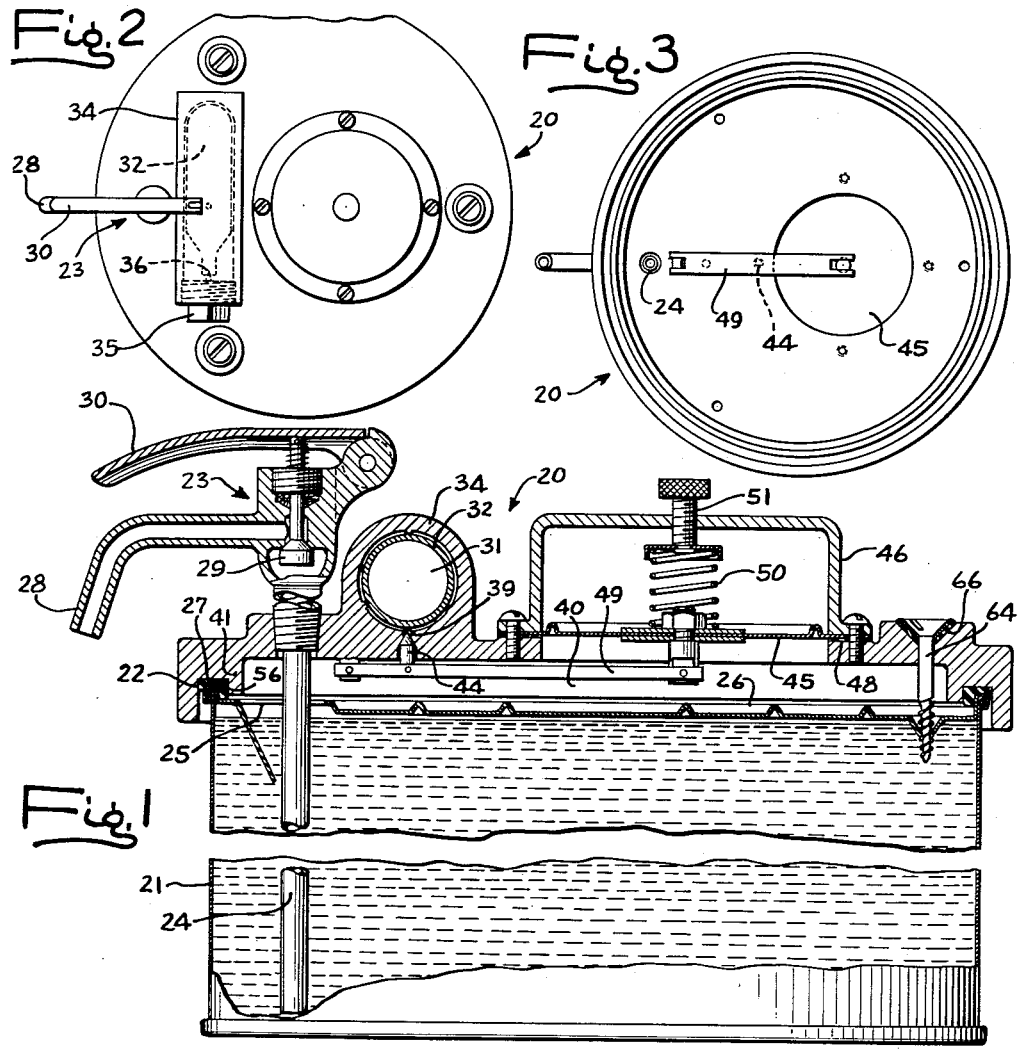
INVENTOR
WILBUR G. MIDNIGHT
by: Carlson, Pitzner, Hubbard & Wolfe
ATTYS.

Oct. 31, 1961 W. G. MIDNIGHT 3,006,515
BEVERAGE CONTAINER AND DISPENSER DEVICE
Filed Sept. 16, 1957 3 Sheets-Sheet 2

INVENTOR
WILBUR G. MIDNIGHT
ATTYS.

Oct. 31, 1961 W. G. MIDNIGHT 3,006,515
BEVERAGE CONTAINER AND DISPENSER DEVICE
Filed Sept. 16, 1957 3 Sheets-Sheet 3
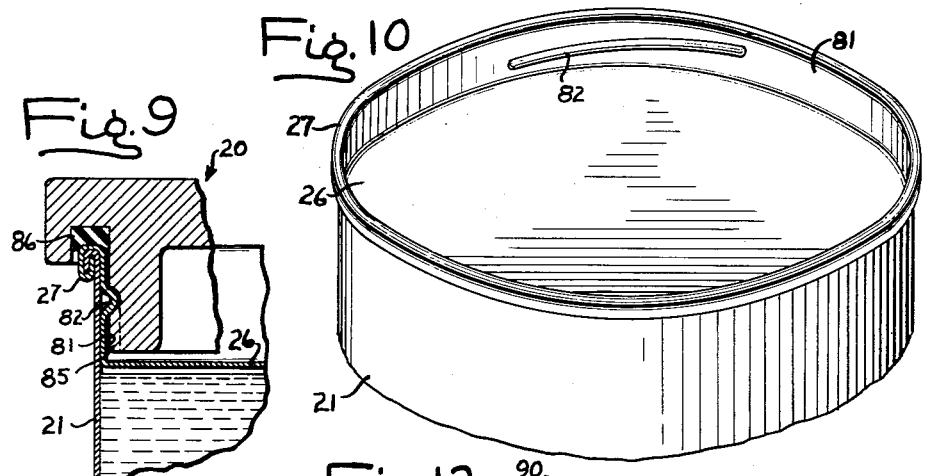
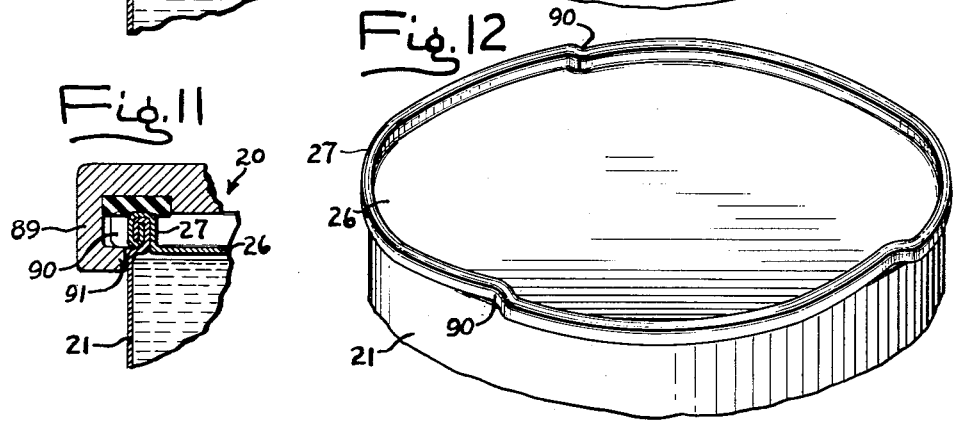
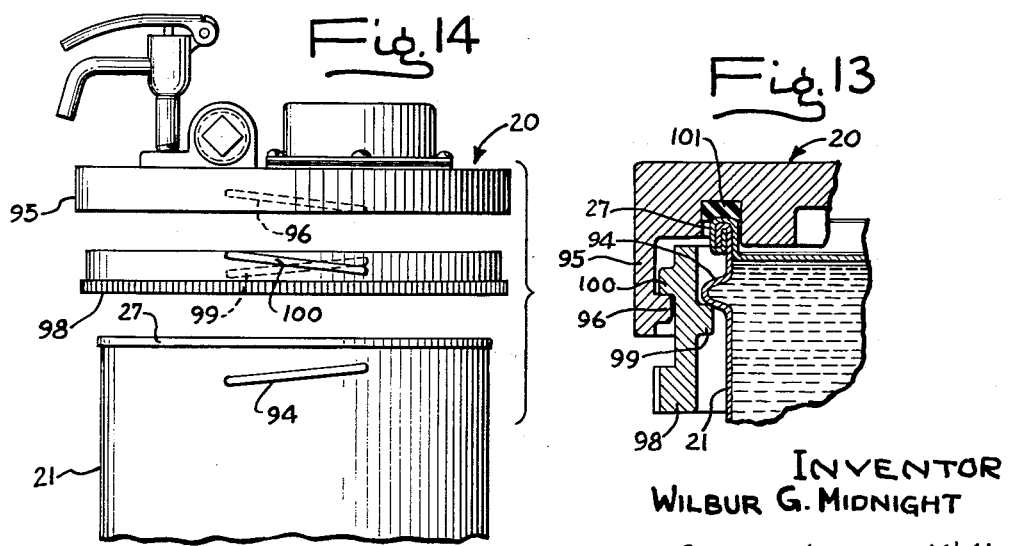
INVENTOR
WILBUR G. MIDNIGHT
by: Carlson, Pitzner, Hubbard & Wolfe
ATTYS.

United States Patent Office 3,006,515
Patented Oct. 31, 1961

3,006,515
BEVERAGE CONTAINER AND
DISPENSER DEVICE
Wilbur G. Midnight, P.O. Box 617, Ogden Dunes, Ind.
Filed Sept. 16, 1957, Ser. No. 684,318
9 Claims. (Cl. 222—396)

The present invention relates to a device for use in dispensing beverages under pressure from a container. More particularly, the present invention relates to a dispenser head for use with a disposable container for a beverage such as draught beer and the like and including a controlled source of gas for dispensing the beverage from the container. For example, such a gas would be carbon dioxide when carbonated beverages are dispensed.

Although the dispenser head and container of the present invention will be found useful for dispensing many types of beverages, the invention finds particular utility for dispensing draught beer from containers of a size suitable for storage in a conventional household refrigerator. It is generally conceded among beer consumers that beer on draught has a much better and more satisfactory flavor than beer supplied in the usual 12 ounce cans or bottles, particularly because the canned and bottled beer is pasteurized to prevent fermentation or spoilage during storage at room temperature. Draught beers, on the other hand, are not pasteurized and may spoil unless refrigerated. Beer is commonly supplied in containers of about 12 ounce capacity. With the dispenser head of the present invention, however, larger containers can be employed and, with the dispenser device attached, can be stored under pressure in a refrigerator. For example, the number 10, or one gallon size container can be employed and is of a size suitable for household use. Accordingly, the larger size barrels and fractional barrels in which draught beer is commonly shipped is no longer a limitation on the dispensing of draught beer. Also, the dispenser device embodying the invention described herein is particularly suited for dispensing draught beer from number 10 or gallon size cans which can be shipped under refrigeration and yet stored in a household refrigerator. Furthermore, a single one gallon container consumes far less space in the normal household refrigerator than does the same quantity of beer or beverage in 12 ounce containers.

It is the principal object of the present invention to provide an improved dispenser device which when secured to a beverage container is capable of pressurizing and dispensing the beverage in selected quantities and with the desired amount of gas dissolved in the beverage.

Although containers have been devised which provide a combination of storing and dispensing means, the container portion is generally not disposable but is attached to and a part of the dispenser portion. With such an arrangement the entire assembly must be returned to the supplier for cleaning, refilling and recharging. It is therefore, another object of the present invention to provide a dispenser device of the foregoing character which is easily and quickly attachable to a disposable container and which is of a size such that the container and attached dispenser can be conveniently stored in a household refrigerator.

It is a further object of the present invention to provide a dispenser head of the above type which employs a commercially available source of gas such as small disposable cartridges.

With the dispenser head of the above character, draught beer may be canned in its unpasteurized condition and shipped under refrigerated conditions and yet dispensed by the user under the desired pressure and with the desired amount of carbonation. While the dispenser head of the present invention will find particular utility in the dispensing of draught beer, the same advantages may be obtained with soft drinks or sodas. These beverages, when shipped in the herein described cans and dispensed by means of the dispenser device embodying the present invention, will be available in the desired quantity with the proper amount of carbonation.

Other objects and advantages of the present invention will become apparent as the following description proceeds, taken in connection with the accompanying drawings wherein:

FIGURE 1 is an elevation view in section of a beverage container and a dispensing device illustrative of the present invention.

FIG. 2 is a plan view of the dispenser head shown in FIG. 1.

FIG. 3 is a bottom view of the dispenser head shown in FIG. 1.

FIG. 4 is a view of an end of a container to which the dispenser head shown in FIG. 1 can be attached.

FIG. 9 illustrates another modified form of means for attaching a dispenser head to a container.

FIG. 10 illustrates a container for use with the attaching means shown in FIG. 9.

FIG. 11 illustrates still another modified form of means for securing a dispenser to a container.

FIG. 12 illustrates a container for use with the attaching means shown in FIG. 11.

FIG. 13 illustrates still another modified form of means for attaching a dispenser head to a container.

FIG. 14 shows a clamping ring for use with the dispensing head and container shown in FIG. 13.

Figure 5:
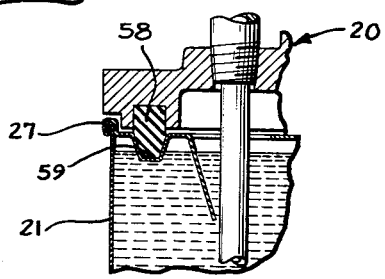
FIGS. 5 and 6 illustrate modified forms of sealing means on a dispenser head and show containers for use therewith.

While certain illustrative forms of invention have been shown in the drawings and will be described below in detail, it should be understood that there is no intention to limit the present invention to the specific forms disclosed. But on the contrary, the intention is to cover all modifications, alternative constructions, equivalents and uses falling within the spirit and scope of the invention as expressed in the appended claims.

Referring to FIGURE 1, there is shown one form of a dispensing device illustrative of the present invention and comprising a head 20 mounted in place on a container 21 which may be, for example, a number 10 size can containing draught beer or other beverage. It will be appreciated that the head is relatively flat compared to the overall height of the can. The head construction, as shown in the drawings, is admirably suited for formation by a casting operation, although other fabrication methods such as stampings could be used to advantage. The head is mounted on one end of a can, a gasket 22 being provided to form a seal between the head and the can. Fastening means, to be described in more detail below, are provided to secure the head to the can.

For withdrawing the beer or beverage from the can 21, a spigot 23 is provided on the head communicating with a tubular conduit or dip tube 24 extending downwardly from the head through a hole 25 which has been opened, by the usual beer can opener for example, in a cover 26 of the can 21. The cover 26 is fastened to the can by the usual bead 27 formed by folding the corresponding edges of the cover and can body. The tube 24 is immersed in the beer and extends substantially to the bottom of the can. The spigot is formed with a spout 28, and includes a valve 29 actuated by a handle 30 for establishing communication between the spout 28 and the dip tube 24.

The beverage is forced up the tube 24 and out of the spout by applying a pressure fluid to the container.

To this end a source of pressure fluid 31 is provided on the head. One example of such a fluid is carbon dioxide which is commonly employed for both pressurizing the beverage and for carbonating it. When carbon dioxide is used as a pressurizing gas, some of the carbon dioxide will be dissolved in the beer to the extent determined by the pressure and temperature conditions of the beverage. For example, one source of pressure fluid gas 31 such as carbon dioxide is the small cartridge or cylinder 32 of the type commonly sold commercially for use in seltzer bottles for the formation of carbonated water. One form of such a cartridge of carbon dioxide is sold under the trade name "Sparklets."

For the purpose of mounting a pressure fluid cartridge 32 in the head 20, a cartridge housing or receptacle 34 is provided on the head. The receptacle is sealed by a cap or plug 35 threaded in the open end of the receptacle. The cap 35 when screwed in place forces the cartridge against a piercing pin 36 which punctures this gas outlet end of the cartridge. The released gas flows through a suitable passage 39 into a chamber 40, defined between the head and the container by an annular wall 41 depending from the head, and thence flows through the aperture 25 opening in the top of the container.

As one alternative source of carbon dioxide, a piece of Dry Ice can be placed in the receptacle 34 in place of the cartridge 32 and the plug 35 inserted in place to seal it. An added advantage is derived from the use of Dry Ice in that additional cooling is provided to the head and container as the Dry Ice sublimes.

In accordance with one aspect of the present invention the pressure applied to the surface of the beer in the container is regulated in order to control the amount of carbonation of the beer and to control the dispensing pressure. To this end, the cross sectional area of the passage opening between the cartridge receptacle and the beer in the container is controlled by a valve 44. When the pressure in the container above the beer reaches the desired maximum level, the valve 44 closes the passage to shut off the supply of carbon dioxide, and when the pressure in the container drops the valve 44 opens the passage to allow a further supply of gas to flow into the container from the cartridge.

Means sensitive to the gas pressure in the head chamber and on the beer in the container is provided for operating the valve 44 to control the flow of gas to the beverage. One illustrative means comprises a flexible diaphragm 45 which is sealed in the head at one side of the cartridge chamber. One face of the diaphragm is exposed to atmospheric pressure while the other face is exposed to the pressure in the chamber 40 and thus within the container 21. The diaphragm is mounted and held to the head by means of a cap or spider 46 which holds the diaphragm to the head. A suitable gasket 48 may be inserted between the diaphragm and head to seal it against the leakage of gas.

The flexible diaphragm 45 is operatively connected to the valve 44 so that as the diaphragm is flexed in and out in accordance with the gas pressure existing within the chamber 40 the valve is opened or closed. One illustrative means for operatively connecting the diaphragm to the valve is shown in the drawings as an arm 49 pivoted at one end to the diaphragm, at the other end to the head, and intermediate its ends to the valve 44. Because the pressure within the chamber and container will be greater than atmospheric pressure a biasing spring 50 is provided on the atmospheric side of the diaphragm 45 to afford a pressure adjustment. The spring compression may be adjusted by a thumb screw 51 threaded in the spider 46, and in this manner the pressure within the container at which the valve is operated can be regulated. If desired, a suitable indicator scale can be stamped onto the spider 46 as a guide for pressure adjustment by the thumb screw.

In order to prevent the existence of an excessive pressure within the container, a pressure relief device such as a relief valve, rupture disc, etc., indicated generally at 54, is desirably provided in the head to permit escape of excess gas from the container. When a relief valve is used it can be constructed to open when a maximum pressure within the container is reached and to close when the pressure drops below that maximum. Such a relief valve would then function, for example, in the event the pressure regulation mechanism should fail to operate, or in the event that the temperature of the container rises so that the internal pressure is increased to above the permissible maximum.

In accordance with another aspect of the present invention, novel means are provided for fastening and sealing the head on the container. Referring to FIG. 1 the head is there shown covering the entire upper surface of the container and the bead 27 on the end of the container is received against the gasket 22 supported in an annular groove 56 formed on the underside of the annular wall 41 on the head.

Figure 6:
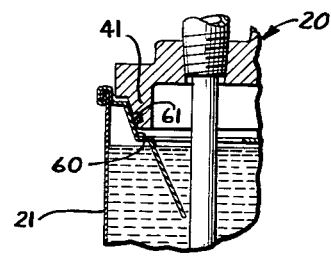

A modified form of seal is shown in FIG. 5 and comprises an annular gasket 58 of resilient material depending from the wall 41 of the head and extending into sealing relation with an annular groove 59 in the end of a container 21. In FIG. 6 there is shown another modified form of seal for use with a container having a cup-shaped or dished end configuration providing an annular surface 60. To form a seal a gasket 61 is mounted on the outer surface of the annular wall 41 of the head and engages the annular surface 60 of the container.

The head is fastened to the container in any suitable manner, one means being shown in FIG. 1 for purpose of illustration and comprising sheet metal screws 64 extending through the head 20 and into engagement with the container end 26. The end of the container is desirably prestamped to form spaced depressions 65 (FIG. 4) which may be punctured and then receive an inserted end of a sheet metal screw 64. The sheet metal screws are, of course, sealed to the head by gaskets 66 or the like surrounding the screw head to prevent the escape of gas.

Figure 7:
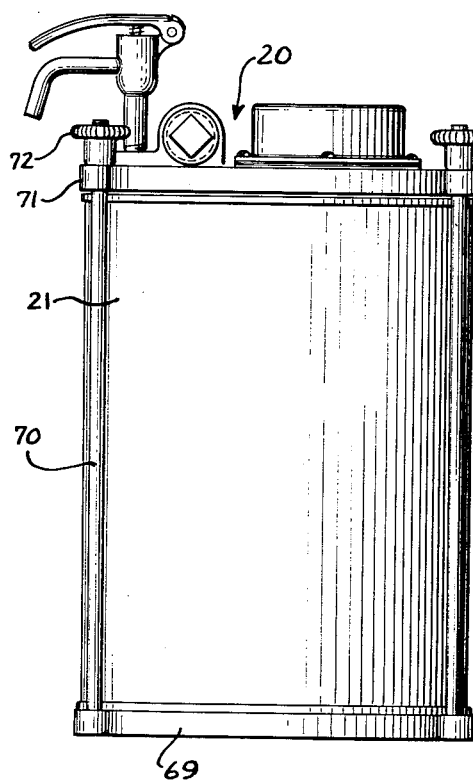
FIG. 7 illustrates a modified form of means for attaching a dispenser head to a container.

FIG. 7 illustrates an alternative means for fastening the head 20 in sealing relation on the container 21. This means comprises a base plate 69 on which the container is placed and tie rods 70 extending between projections 71 on the head 20 and having clamping nuts 72 threaded on their free ends. By tightening the clamping nuts 72 on the tie rods 70 the head is fastened against the end of the container. Any of the above described sealing means can be employed.

Figure 8:
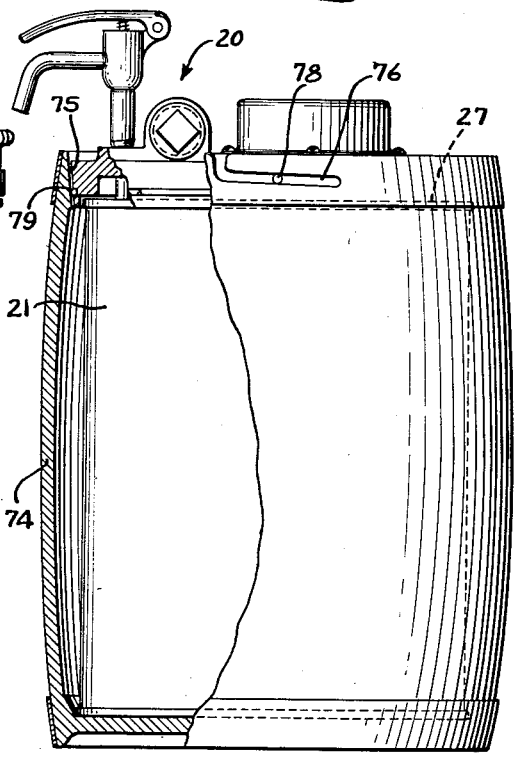
FIG. 8 illustrates a disposable container sealed within a dispenser housing embodying the present invention.

In FIG. 8 there is shown a modified form of the invention wherein the head 20 is sealed to a housing 74 into which the container 21 is inserted. The housing 74 may, of course, be of a suitable pleasing design and may be provided with insulating means.

For purposes of fastening the head 20 to the housing 74 a bayonet slot 76 adjacent the upper end of the housing is engaged by a pin 78 on the head. The head is sealed to the housing mouth by means of an appropriate gasket 79 to afford a pressure tight connection.

FIGS. 9 and 10 illustrate an alternative fastening means for securing the head 20 in sealing relation on the container 21. This means comprises forming the container cover 26 in the shape of a cup to provide upstanding annular walls 81. The cover is inserted within the container and secured at its upper ends to the container wall in the usual manner by forming a bead 27. For fastening the head 20 to the container cover 26, threads 82 are formed on the annular walls 81 of the cover 26. These threads may be formed, for elample, by embossing the cover before it is secured in place on the container. The head 20 is constructed with a depending annular wall having suitable lugs or projections 85 spaced thereon for engagement with the threads 82 on the container cover 26.

For sealing the head to the container the head is provided with an annular gasket 86 surrounding the wall 85 for receiving, in sealing relation, the bead 27 on the upper end of the container. tI will be appreciated that the pitch of the threads 82 must be sufficiently great to afford a clamping action when the head is rotated through a small angle so as to avoid interference with the container by the dip tube 24. Alternatively the dip tube 24 extending from the head into the container may be removed before the head is tightened in place and then inserted into the head and container after the head is in place. If desired, the dip tube 24 can be located centrally of the head to avoid interference with the container when the head is rotated and mounted in place.

In FIGS. 11 and 12 there is shown a further alternative means for securing the head to the container. In this modification the head is provided with a depending annular skirt 89 for surrounding the bead 27 of the container 21. For clamping the head to the container the bead 27 is formed with a plurality of notches or depressions 90 (FIG. 12) to permit corresponding inwardly extending radial lugs 91 on the lower extremity of the skirt 89 to be engaged under the bead 27. The grooves 90 are desirably angled or spiraled with respect to the bead to afford a camming action pulling the head tightly against the container as the former is rotated.

A further alternative means for fastening the head 20 to the container 21 is shown in FIGS. 13 and 14. In this modification the container 21 is formed with externally embossed threads 94 while the cap 20 is provided with a depending skirt 95 having threads 96 on its inner annular surface. For clamping the head to the container an annular ring 98 is inserted between the skirt and the container and is provided with threads 99 and 100 on its inner and outer surfaces respectively engageable with the corresponding threads on the container and the cap. By rotating the clamping ring 98 in one direction the threads are engaged to pull the cap tightly against the container and when rotated in the other direction releases the cap therefrom. A suitable seal between the cap and container is provided by an annular gasket 101 which sealingly receives the container head 27 when the cap is tightened on the container by the ring 98.

It may be helpful at this point to briefly summarize the operation of the dispensing device described above. When the dispenser head 20 has been placed on a container 21, for example a number 10 size can of draught beer, and fastened securely thereto, a cartridge 32 of carbon dioxide gas 31 is inserted into a receptacle 34 on the dispenser head and the receptacle cap 35 is tightened in place. This forces the cartridge 32 against a pin 36 which pierces the cartridge end and allows the carbon dioxide gas to escape. This gas flows through a needle valve controlled passage 39 and into the container 21 through the aperture 25 receiving the spigot tube 24 from the head. The gas is dissolved in the beer until the proper amount of carbonation is achieved as determined by the solubility of the gas at the temperature of the beer and the pressure of gas in the container. This pressure is controlled to provide the proper carbonation and dispensing pressure by the diaphragm 45 which is flexed to close the needle valve when the desired pressure in the container is reached.

The spigot is opened by operating the handle 30 to open the valve 29, and the pressure of the gas in the container forces the beverage up through the spigot tube 24 and out of the spout 28 into a glass or other receptacle. As the beer is dispensed the pressure within the container will drop and the spring will flex the diaphragm to open the needle valve to the carbon dioxide supply. In this manner the pressure in the container remains constant.

I claim as my invention:

1. In a dispensing device for carbonating and dispensing a beverage under pressure from a generally cylindrical disposable container having a cover sealed thereon, said device including a head substantially coextensive with said container cover and having a depending annular rim defining a recessed portion on the lower surface of said head, means fastening said head to said container in sealed relation with said recessed portion forming a chamber between said head and said cover, said chamber communicating with the container through a tubular conduit depending from said head and adapted to extend through an aperture in the container cover into said chamber, said conduit being immersed in the beverage within the container, and a spigot on said head including a dispensing valve and a spout communicating with said tube under the control of said valve, the improvement comprising, means on said head for supplying carbon dioxide to said chamber, means for regulating the supply of carbon dioxide to said chamber, and a pressure sensitive diaphragm mounted in said head and having one surface exposed in said chamber and the other surface exposed to the atmosphere, said diaphragm being operative in response to pressure changes within said chamber for actuating said regulating means to maintain a regulated dispensing and carbonating pressure in said chamber and container.

2. In a dispensing device for carbonating and dispensing a beverage under pressure from a generally cylindrical disposable container having a cover sealed thereon, said device including a head substantially coextensive with said container cover and having a depending annular rim defining a recessed portion on the lower surface of said head, means for attaching said head to said container with said recessed portion forming a chamber between said head and said cover, a gasket between said rim and the cover for sealingly enclosing said chamber, said chamber communicating with the container through a tubular conduit depending from said head and adapted to extend through an aperture in the container cover into said chamber, said conduit being immersed in the beverage within the container, a spigot on said head including a dispensing valve and a spout communicating with said tube under the control of said valve, the improvement comprising a receptacle on said head for receiving a cartridge of carbon dioxide for supplying carbon dioxide to said chamber, means defining an aperture through said head opening into said chamber, means mounted in said aperture sensitive to the pressure of carbon dioxide in said chamber, means defining a passage between said receptacle and said chamber, a valve in said passage, and means operatively connecting said pressure sensitive means and said valve for controlling the carbon dioxide pressure in said chamber.

3. In a dispensing device for carbonating and dispensing a beverage under pressure from a generally cylindrical disposable container having a cover sealed thereon, said device including a head substantially coextensive with said container cover and having a depending annular rim defining a recessed portion on the lower surface of said head, means for attaching said head to said container with said recessed portion forming a chamber between said head and said cover, a gasket between said rim and the cover for sealingly enclosing said chamber, said chamber communicating with the container through a tubular conduit depending from said head and adapted to extend through an aperture in the container cover into said chamber, said conduit being immersed in the beverage within the container, and a spigot on said head including a dispensing valve and a spout communicating with said tube under the control of said valve, the improvement comprising, means on the upper surface of said head defining a receptacle for receiving a source of carbon dioxide, a plug for sealing said receptacle, means defining a passage between said receptacle and said chamber, a valve for controlling the opening of said passage, means defining an aperture though said head, a pressure sensitive diaphragm mounted in said aperture and having one surface exposed to said chamber and the other surface exposed to the atmosphere, an adjustable spring means mounted on the atmospheric side of said head for biasing said diaphragm, and a linkage operatively connecting said diaphragm to said valve for operating the latter to control the opening of said passage in response to pressure changes within said chamber so that a controlled dispensing and carbonating pressure of carbon dioxide is maintained within said chamber and the container.

4. The dispensing device defined in claim 1 wherein said fastening and sealing means comprises a plurality of sheet metal screws extending through said head into engagement with the container cover and sealing means between said head and the container for sealingly enclosing said chamber.

5. The dispensing device defined in claim 4 wherein the depending annular rim includes an annular resilient gasket member depending therefrom into sealing engagement with said cover.

6. The dispensing device defined in claim 4 wherein the depending annular rim includes an annular gasket on the external surface thereof sealingly engaged with said container cover.

7. The dispensing device defined in claim 1 wherein the container is formed with an upstanding annular end portion defining a cup-shaped end having an inwardly directed annular wall defining embossed threads thereon and said fastening and sealing means comprises thread means on said annular rim engageable with the container threads and gasket means sealingly engaging the upper edge of the end portion.

8. The dispensing device defined in claim 1 wherein the container is formed with a sealing bead on the end adjacent the cover and said fastening and sealing means comprises means on said annular rim engaged with said bead and gasket means sealingly engaging said bead.

9. The dispensing device defined in claim 1 wherein the container is formed with a plurality of radially projecting thread members embossed on the external surface adjacent the cover end and said fastening and sealing means comprises gasket means for sealing the head to the container and a plurality of thread members on the internal surface of said annular rim, and an annular clamp member adapted to be interposed between said rim and said container and having on its inner and outer radial surfaces thread members cooperable with the corresponding thread members on said rim and said container for clamping said head to said container upon rotation of said clamp member in one direction and for releasing said head from said container upon rotation in the opposite direction.

References Cited in the file of this patent

UNITED STATES PATENTS

| | | |
|---|---|---|
| 523,951 | Van Fleet | July 31, 1894 |
| 943,421 | Kleinfeldt | Dec. 14, 1919 |
| 1,885,678 | Boyer | Nov. 1, 1932 |
| 2,061,642 | Williamson | Nov. 24, 1936 |
| 2,120,297 | Reinecke | June 14, 1938 |
| 2,196,997 | Larson | Apr. 16, 1940 |
| 2,753,080 | Bartlett | July 3, 1956 |